US008767657B1

(12) United States Patent
Dehghan et al.

(10) Patent No.: US 8,767,657 B1
(45) Date of Patent: Jul. 1, 2014

(54) MIXED-MODE MIMO DETECTOR IN A LOCAL AREA NETWORK

(75) Inventors: Hossein Dehghan, Danville, CA (US); Sam Heidari, Los Altos Hills, CA (US); Muhammad Abdelghaffar, Irvine, CA (US)

(73) Assignee: Quantenna Communications Inc., Fremont, CA (US)

( * ) Notice: Subject to any disclaimer, the term of this patent is extended or adjusted under 35 U.S.C. 154(b) by 64 days.

(21) Appl. No.: 13/506,457

(22) Filed: Apr. 19, 2012

Related U.S. Application Data

(60) Provisional application No. 61/477,008, filed on Apr. 19, 2011, provisional application No. 61/494,823, filed on Jun. 8, 2011.

(51) Int. Cl.
*H04W 4/00* (2009.01)
(52) U.S. Cl.
USPC .......................................................... 370/329
(58) Field of Classification Search
None
See application file for complete search history.

(56) References Cited

U.S. PATENT DOCUMENTS

| | | | | |
|---|---|---|---|---|
| 6,181,754 | B1* | 1/2001 | Chen | 375/350 |
| 2004/0047438 | A1* | 3/2004 | Zhuang et al. | 375/340 |
| 2004/0066866 | A1* | 4/2004 | Tong et al. | 375/347 |
| 2005/0002468 | A1* | 1/2005 | Walton et al. | 375/267 |
| 2006/0034244 | A1* | 2/2006 | Huang et al. | 370/344 |
| 2009/0074097 | A1* | 3/2009 | Sadowsky | 375/260 |
| 2009/0116588 | A1* | 5/2009 | Mcnamara et al. | 375/340 |
| 2010/0067596 | A1* | 3/2010 | Park et al. | 375/262 |

OTHER PUBLICATIONS

D. Wubben, R. Bohnke, J. Rinas, V. Kuhn, K.D.Kammeyer: "Efficient Algorithm for Decoding Layered Space-Time Codes" Electronics Letters, Oct. 25, 2001.
C. Studer, A. Burg, H. Bolcskei: "Soft-output Sphere Decoding: Algorithms and VLSI Implementation" Selected ed Areas in Communications, IEEE Journal on, vol. 26, No. 2, pp. 290-300, Feb. 2008.
L.G. Barbero, J.S. Thompson: "Performance of the Complex Sphere Decoder in Spatially Correlated MIMO Channels" Communications IET, vol. 1, No. 1, pp. 122-130, Feb. 2007.

* cited by examiner

*Primary Examiner* — Chi Pham
*Assistant Examiner* — Fahmida Chowdhury
(74) *Attorney, Agent, or Firm* — IP Creators; Charles C Cary

(57) ABSTRACT

A wireless device with multiple antennae and configured to support orthogonal frequency-division multiplexed (OFDM), multiple-input multiple-output (MIMO) communications of a wireless local area network (LAN) among multiple wireless devices over a shared wireless communication medium on a shared communication channel. The wireless access device comprises: a mixed-mode MIMO detector configured to allocate a mix of linear and non-linear MIMO detectors among received OFDM sub-channels of the shared communication channel, thereby reducing a level of complexity associated with reception of MIMO streams exclusively via non-linear MIMO detectors.

9 Claims, 7 Drawing Sheets

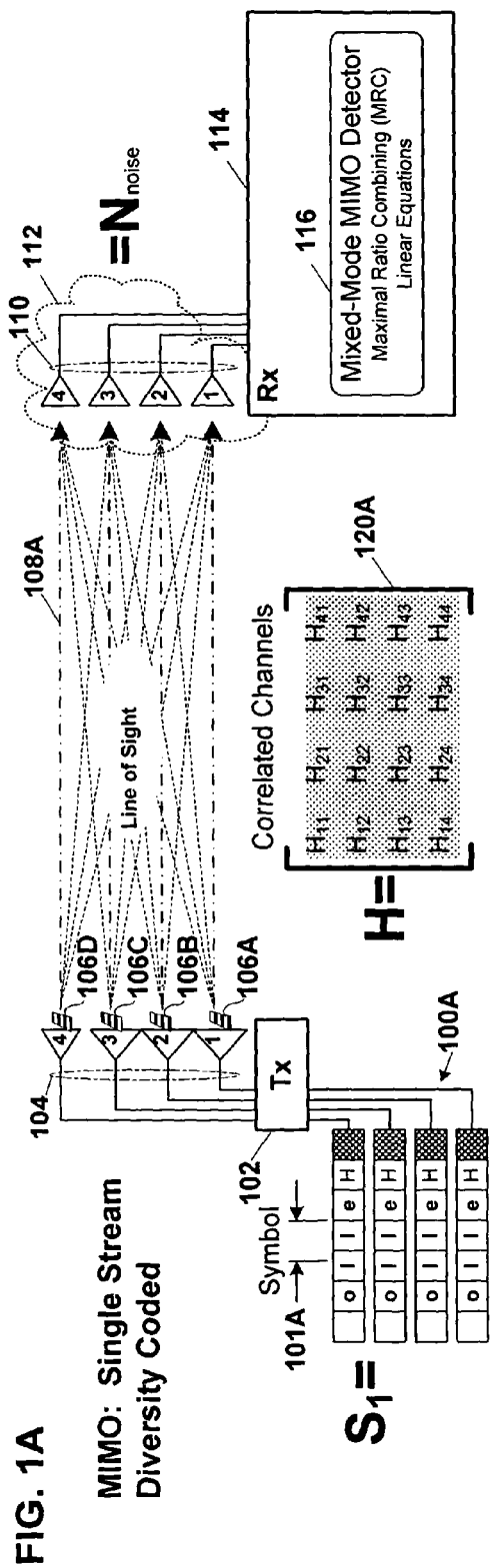
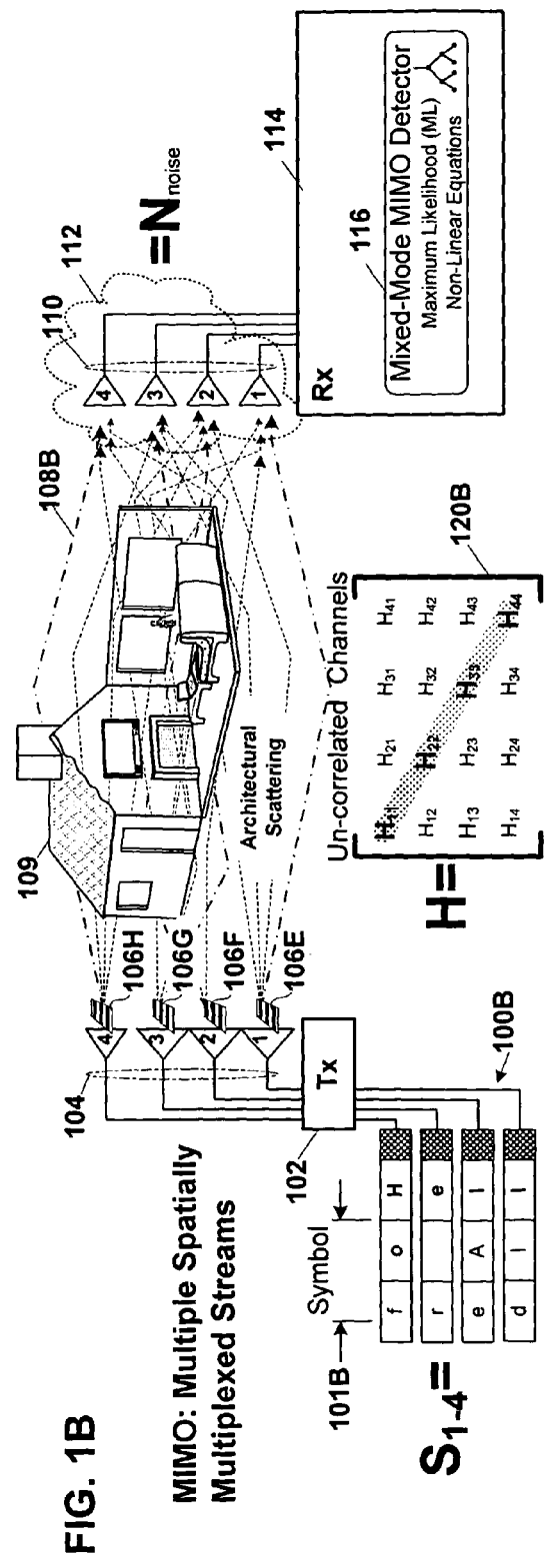
FIG. 1A
MIMO: Single Stream Diversity Coded
FIG. 1B
MIMO: Multiple Spatially Multiplexed Streams

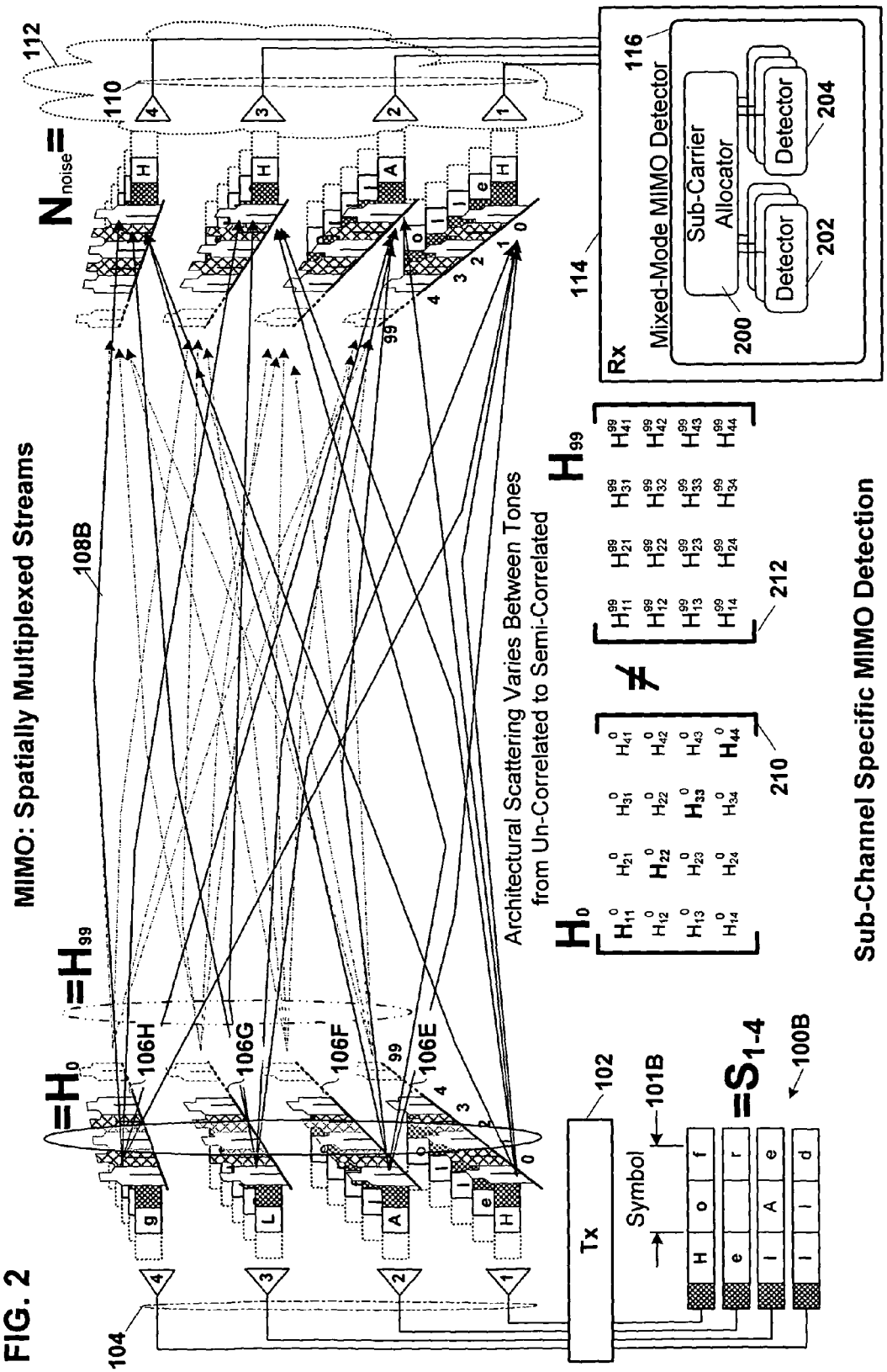

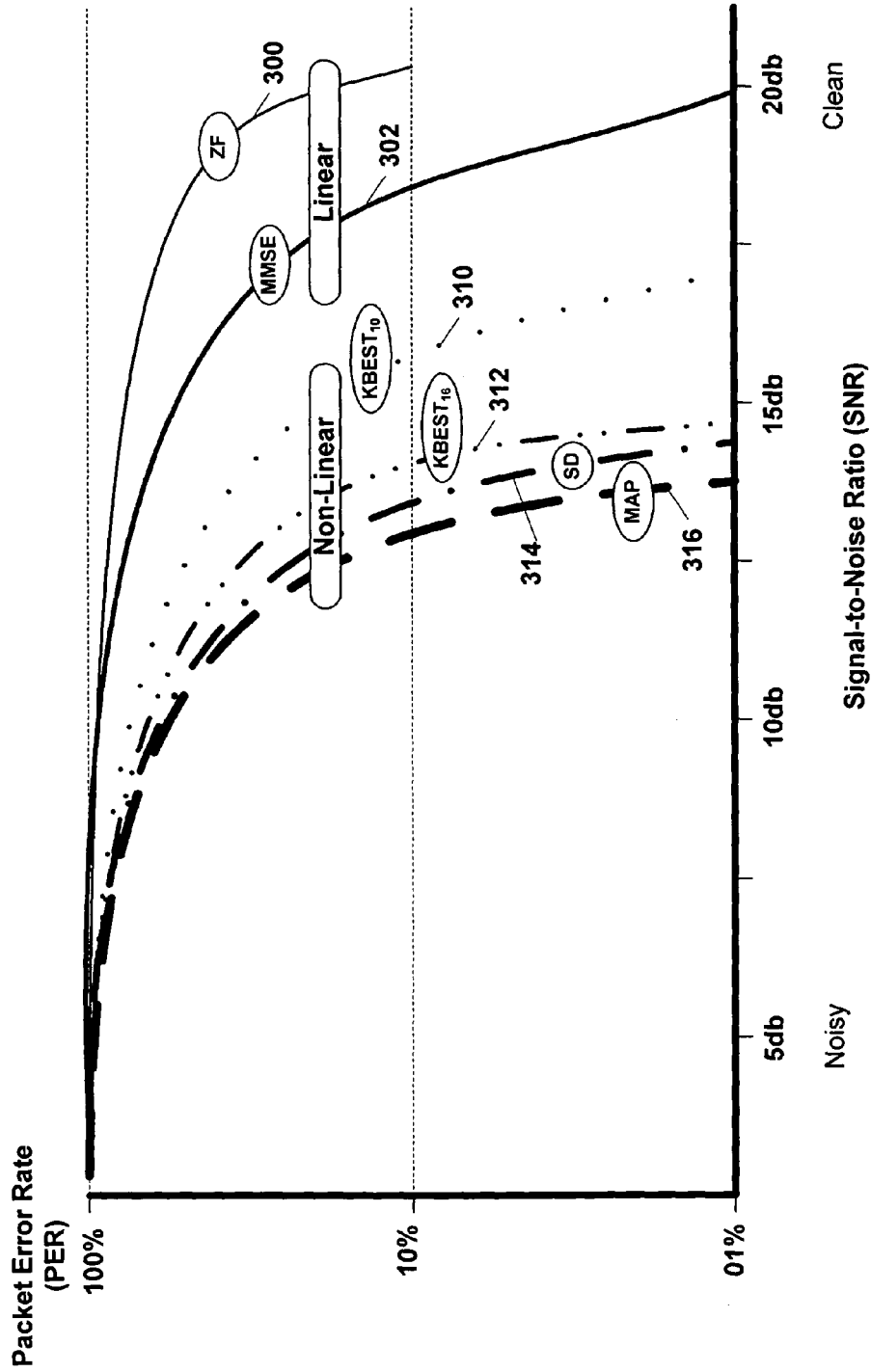

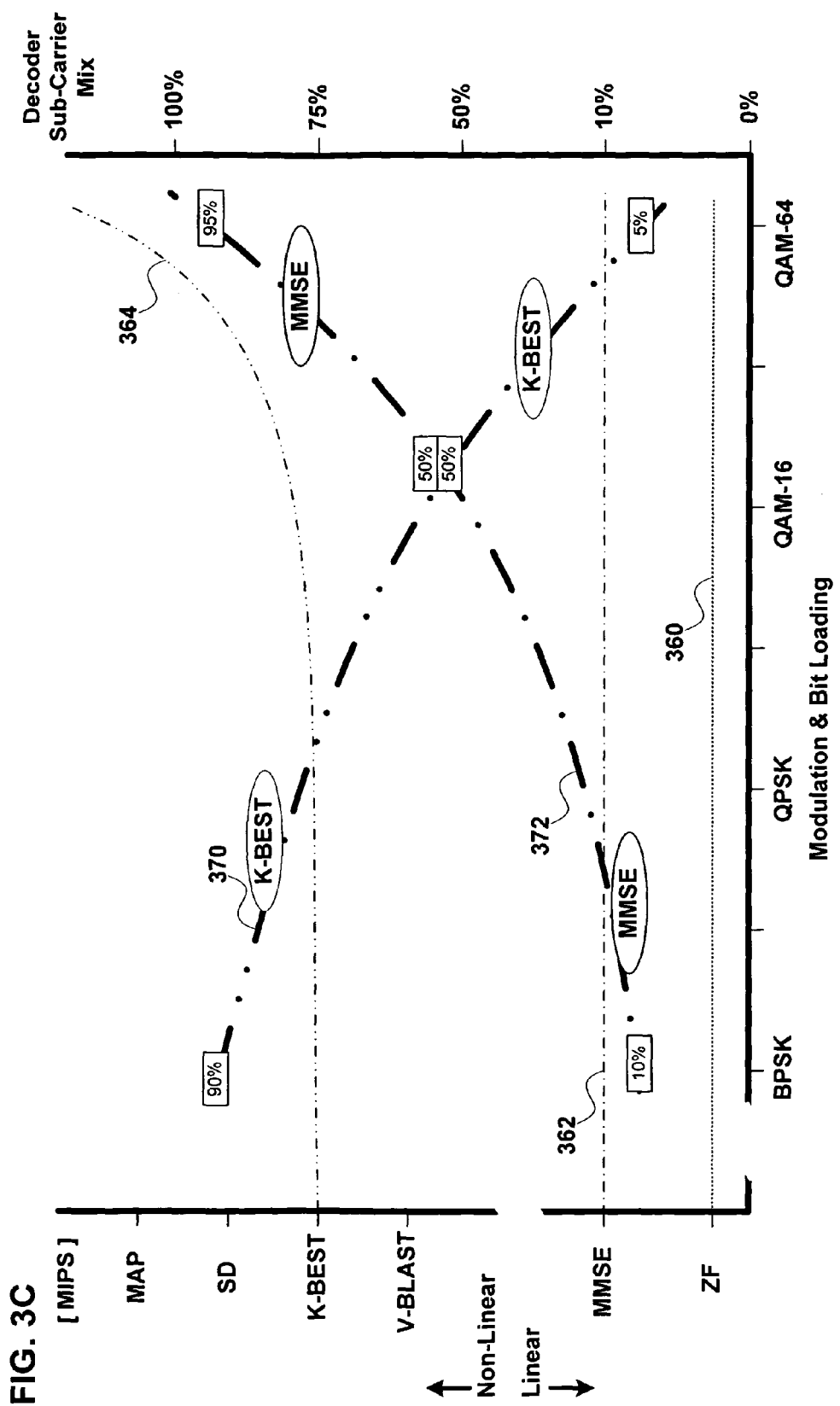

Wi-Fi Node: with Mixed-Mode MIMO Detector

Mixed-Mode MIMO Detection

US 8,767,657 B1

MIXED-MODE MIMO DETECTOR IN A LOCAL AREA NETWORK

CROSS REFERENCE TO RELATED APPLICATION

This application claims the benefit of prior filed co-pending Provisional Applications No. 61/477,008 filed on Apr. 19, 2011 entitled "Efficient Channel Ordering for Near Optimum MIMO Detection" and No. 61/494,823 filed on Jun. 8, 2011 entitled "Method & Apparatus for Tone Discriminated Near-Optimum MIMO Decoding" which are incorporated herein by reference in their entirety as if fully set forth herein.

BACKGROUND OF THE INVENTION

1. Field of Invention

The field of the present invention relates in general to Wi-Fi wireless access points (WAP) and devices for wireless local area networks (LAN).

2. Description of the Related Art

Wireless local area networks (LAN) such as home or office networks are increasingly set up and serviced using a device called a Wireless Access Point (WAP). The WAP couples all the devices of the wireless LAN, e.g. computers, printers, televisions to one another and to the Cable or Subscriber Line through which Internet, video, and television is delivered to the home or business. Most WAPs implement the IEEE 802.11 standard which is a contention based standard for handling communications among multiple competing devices for a shared wireless communication medium. The WAP controls access to the shared communication medium using a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the line is in use. Collisions however are not easily detected in wireless home network communications, and therefore a competing links are subject to a further refinement identified as Collision Avoidance, in one form of which a link sends a request over the wireless medium which only elevates to actual data transmission if clearance to send is received from the target device. Thus the contention based protocol for wireless home networks is identified as Collision Sense Multiple Access/Collision Avoidance (CSMA/CA).

Typically wireless LAN employ the a multi-tone modulation protocol known as orthogonal frequency division multiplexing (OFDM) in which multiple communication sub-channels or tones are used to transmit data. Typically, each tone has the same constellation or modulation protocol as every other tone. Additionally, bit loading and power mask may also be identical.

To improve bandwidth a wireless device such as a WAP or station may be equipped with multiple antennas and accompanying functionality for Multiple-input and multiple-output, or MIMO communication links. MIMO uses multiple antennas at both the transmitter and receiver to improve communication performance, via either spatial multiplexing of multiple communication streams or diversity of a single stream. MIMO is an important part of modern wireless communication standards for homes such as IEEE 802.11n. Further optimization of transmissions may from multiple antennae may be achieved with beam forming. Optimization includes performing matrix operations on transmitted data from each antenna to compensate for variations in the channel between each source antenna on the WAP and a corresponding target antenna on the target wireless device.

What is needed is a WAP with improved capability for MIMO detection.

SUMMARY OF THE INVENTION

The present invention provides a method and apparatus for a wireless device with multiple antennae and configured to support orthogonal frequency-division multiplexed (OFDM), multiple-input multiple-output (MIMO) communications of a wireless local area network (LAN) among multiple wireless devices over a shared wireless communication medium on a shared communication channel. The wireless access device comprises: a mixed-mode MIMO detector configured to allocate a mix of linear and non-linear MIMO detectors among received OFDM sub-channels of the shared communication channel, thereby reducing a level of complexity associated with reception of MIMO streams exclusively via non-linear MIMO detectors.

The invention may be implemented in hardware, firmware or software.

Associated methods and means are also claimed.

BRIEF DESCRIPTION OF THE DRAWINGS

These and other features and advantages of the present invention will become more apparent to those skilled in the art from the following detailed description in conjunction with the appended drawings in which:

FIGS. 1A, 1B are combined hardware block and data structure diagrams of multiple-input and multiple-output (MIMO) communications exploiting diversity of a single stream and spatial multiplexing of multiple streams respectively;

FIG. 2 is an exploded combined hardware block and data structure diagram of FIG. 1B showing individual orthogonal frequency division multiplexed (OFDM) sub-carriers of the MIMO communications;

FIG. 3A is a graph showing relative signal resolution capability of representative MIMO detectors;

FIG. 3C is a graph showing relative signal resolution capability of a representative mix of selected linear and non-linear MIMO detectors shown in FIG. 3A among selected OFDM sub-carriers under different channel modulation protocols;

DETAILED DESCRIPTION OF THE EMBODIMENTS

Figure 3B:
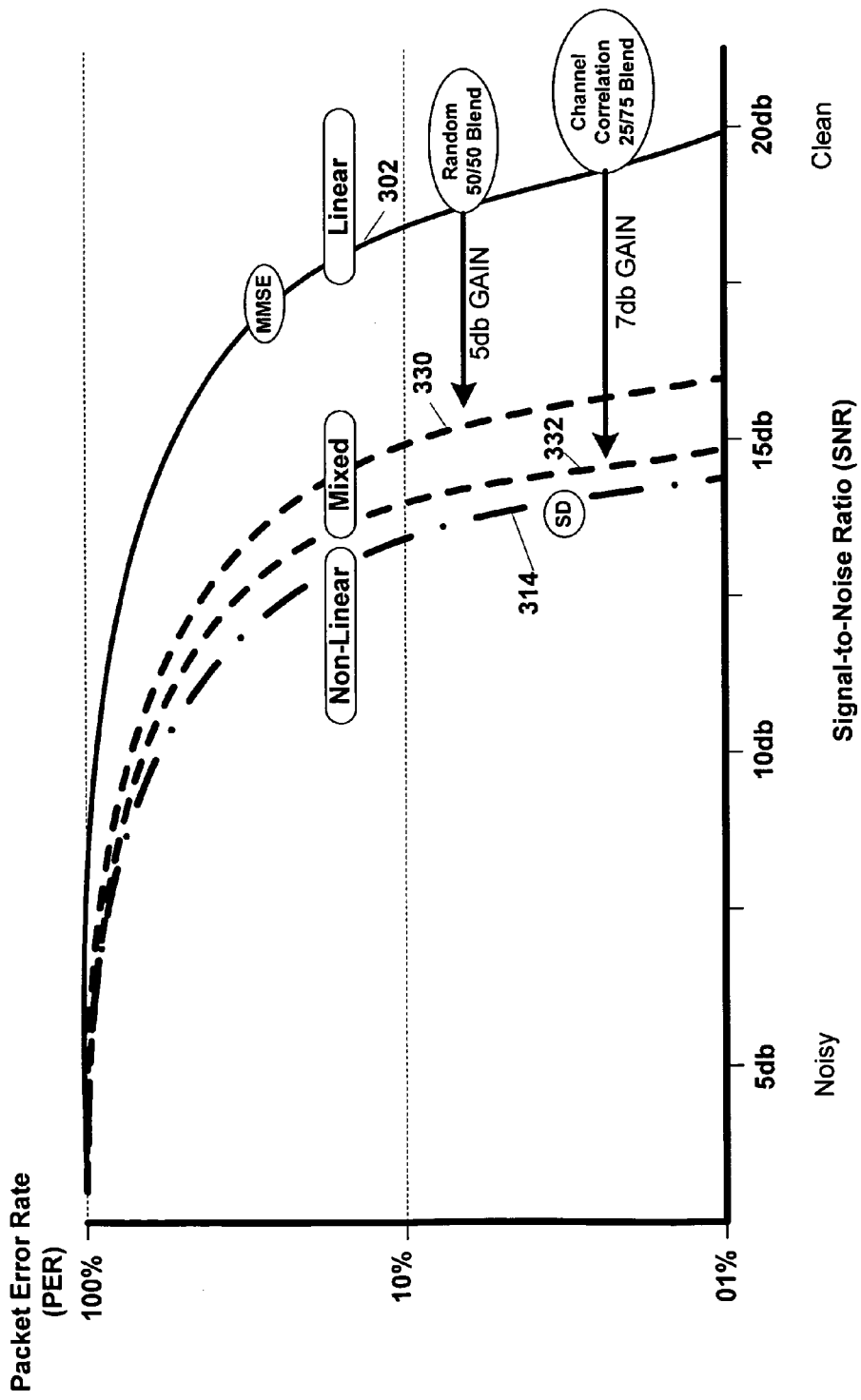
FIG. 3B is a graph showing relative signal resolution capability of a representative mix of selected linear and non-linear MIMO detectors shown in FIG. 3A among selected OFDM sub-carriers.

The main advantage of Orthogonal Frequency Domain Multiplexing systems (OFDM) is it's separation of information into separate and independent bins or orthogonal frequency sub-channels. This separation of the frequency bins will allow channel estimation and mitigation of any channel induced imperfection to happen on per channel basis. In fact, the sub-channel is chosen with coherency in mind in an OFDM system. Given that each sub-channel is relatively narrowband and coherent, one can pick the right algorithm to decode each sub-channel based on apriori knowledge or estimate of the sub-channel. The 'right algorithm' will be the one that gives the best compromise between performance and complexity for the given sub-channel. For example, for a sub-channel that is going through an AWGN channel, the 'right algorithm' will be to use a ZF or MMSE but for another sub-channel where the received streams are highly correlated the 'right algorithm' in the sense of providing the best performance would be MAP.

For a MIMO system of $M_T$ transmit antenna and $M_R$ receive antenna, the received signal per sub-channel can be expressed as:

$$y=Hs+n$$

where H is $M_R$ by $M_T$ channel matrix and s is the transmitted OFDM signal. The transmit signal can be estimated using an MIMO detector. This detector estimates the symbol that minimizes an error metric assuming no apriori information about the transmitted bits/symbols via the following equation.

$$s=Wy$$

For zero forcing (ZF) and maximum mean square error (MMSE) MIMO detectors the equalizer MIMO estimator (W) are given as follows respectively $$W_{ZF}=(H^H H)^{-1} H^H$$

$$W_{MMSE} = \left(H^H H + \frac{E_s}{N_o} I_M\right)^{-1} H^H$$

Alternatively, more complex and better performing non-linear MIMO detection can be used for estimating the transmitted data, for example, a Maximum Likelihood (ML) MIMO detector pick the estimate of transmit signal such that the estimate minimizes the error for all data in a sub-channel as below.

$$s^{ML} = \arg\min_{s \in Q^{M_T}} \|y - Hs\|^2$$

These MIMO detection methods provide varying performance with different degrees of complexity with the better performing ones generally being more complex. There are also simplifications of the algorithms which generally come at some performance cost. For example, k-best algorithm with K=10 is less complex than K=16 but at the cost of performance.

FIGS. 1A, 1B are combined hardware block and data structure diagrams of multiple-input and multiple-output (MIMO) communications exploiting diversity of a single stream and spatial multiplexing of multiple streams respectively in a wireless local area network (LAN) formed between communication devices 102 and 114. Typically communications comport with the IEEE 802.11* standard.

In FIG. 1A wireless communication devices 102 and 114 are shown. Communications are typically simplex, and in the example shown wireless communication device 102 is transmitting the same data on each of four antennae 104 to wireless communication device 114 which receives the communicated data on each of four antenna 110. In the example shown in FIG. 1A a single input data stream "$S_1$" is copied into the transmit packets 100A for redundant transmission from a corresponding one of the four antenna. Data is transmitted in symbols corresponding to a phase and or amplitude offset with respect to a carrier signal. The amount of time required to transmit a symbol is identified as a symbol interval. Additionally, orthogonal frequency division multiplexing (OFDM) is used to inject the transmitted data onto contiguous tones or sub-channels each of which 106A, 106B, 106B, 106D is shown for a corresponding one of the antennae. Each antennae transmits the same data, as every other antennae with the data split between the tones or sub-channels transmitted by each antennae. Data transmitted in this redundant manner concurrently from multiple spatially separated antennae exploits the spatial diversity to improve communications. On the wireless device 114 the received data including any noise "N" 112 introduced by the receiver components is subjected, in Mixed-mode MIMO detector 116, to an appropriate MIMO detection, in this case Maximal Ratio Combining (MRC) or some other linear MIMO detector process to retrieve the transmitted data. Periodically the transmitter and receiver exchange channel models "H" 120A which characterize the channel 108A between transmitter and receiver in order to adjust or improve communications there between. This channel model is a matrix the coefficients of which correspond to the differences in the transmit paths between the subject transmit and receive antennae. The dimensions of the matrix correspond to the number of transmit and receive antennae. Matrix H has relatively uniform coefficients which indicate a high degree of correlation between all paths, corresponding to a "line of sight" channel 108A which supports communication without intervening walls or objects.

In FIG. 1B the wireless communication devices 102, 114 have detected a communication channel 108B which has relatively high degree of scattering brought about by the walls and objects within the encompassing home or business structure. Communications are again simplex, and again exploits multiple antennae but with a significant difference in the data transmitted. The environmental scattering which might initially seem dis-advantageous is instead exploited using a second MIMO methodology identified as spatial multiplexing in which different data is sent from each antennae and further from each of the sub-channels associated therewith and the differences in each communication path from transmit to receive antennae are exploited to detect the originally transmitted data.

In the example shown wireless communication device 102 is now transmitting four different streams "$S_{1-4}$" of data on each of the four antennae 104 to wireless communication device 114 which receives the communicated data on each of four antenna 110. The different streams may be derived either from the same source or from different sources such as audio, video or data. In the example shown in FIG. 1B a single data source, is split into four unique streams which are bundled into four unique packets 100B for transmission from a corresponding one of the four antenna. Data is transmitted in symbols corresponding to a phase and or amplitude offset with respect to a carrier signal. The amount of time required to transmit a symbol is identified as a symbol interval which is typically slightly longer for spatially multiplexed data than for the diversity example shown in FIG. 1A. Again, orthogonal frequency division multiplexing (OFDM) is used to inject the transmitted data onto contiguous tones or sub-channels each of which 106E, 106F, 106G, 106H is shown for a corresponding one of the antennae. Each antenna transmits the unique data from each packet with the data split between the tones or sub-channels transmitted by each antennae. Data transmitted in this non-redundant manner concurrently from multiple spatially separated antennae exploits the spatial multiplexing to improve communications. On the wireless device 114 the received data including any noise "N" 112 introduced by the receiver components is subject, in Mixed-mode MIMO detector 116, to an appropriate MIMO detection, in this case to Spherical Decoding (SD) or some other computationally complex non-linear MIMO detector process to retrieve the transmitted data. Periodically the transmitter and receiver exchange channel models "H" 120B which characterize the channel 108B between transmitter and receiver in order to adjust or improve communications there between. This channel model is a matrix the coefficients of which correspond to the differences in the transmit paths between the subject transmit and receive antennae. The dimensions of the matrix correspond to the number of transmit and receive antennae. Matrix H has relatively small off diagonal coefficients and a rather prominent set of diagonal components which indicate a low degree of correlation between all paths, a.k.a. uncorrelated data paths, corresponding to an architectural environment 109 with relatively high scattering of communications of "un-correlated or scattered" channel 108B resulting from intervening walls or objects.

FIG. 2 is an exploded combined hardware block and data structure diagram of FIG. 1B showing individual orthogonal frequency division multiplexed (OFDM) sub-carriers of the MIMO communications. The individual sub-carriers, a.k.a. tones, of each toneset or carrier 106E, 106F, 106G, 106H are shown. Each is identified by an index number which in the example shown ranges from "0" to "99". In a communication channel 108B with high levels of scattering and corresponding generally un-correlated communication paths, it may nevertheless be the case that certain ones of the sub-carriers or tones are semi-correlated with one another and thus susceptible to MIMO detection which is are as computationally complex as that required for others of the sub-channels. The current invention exploits these differences specifically in the mixed-mode MIMO detector 116 which is one of the receive path components in both wireless devices 102 and 114. In the embodiment shown the mixed-mode MIMO detector includes a bank or pool of available linear 202 and non-linear 204 detectors and an allocator 200 for determining which received sub-carrier is routed to which detector. The detectors may be implemented in hardware, software or firmware without departing from the scope of the claimed invention.

In the example shown in FIG. 2 for each of the sub-channel sets, a.k.a. tone-sets: 106E, 106F, 106G, 106H, the signal modulated on each tone having an index "99" follows a direct path from the transmitting antenna to each of the four receive antennae 110. The corresponding sub-channel matrix 212 $H_{99}$ exhibits this relatively high degree of correlation between the transmit paths in terms of the relatively uniform matrix coefficients.

Conversely, and by way of example, the signal modulated on each tone having an index "0" follows a less direct path with relatively greater scattering from the transmitting antenna to each of the four receive antennae 110. The corresponding sub-channel matrix 210 $H_0$ exhibits this relatively low degree of correlation between the transmit paths in terms of the relatively modest off-diagonal matrix coefficients and the relatively large diagonal coefficients.

Sub-channel matrix $H_0$ indicates that the multiple transmit paths for tone "0" are un-correlated or have a low degree of correlation. Conversely, sub-channel matrix $H_{99}$ exhibits relatively higher degree of correlation or is semi-correlated. In an embodiment of the invention the sub-carrier allocator 200 of the mixed-mode MIMO detector allocates, non-linear and relatively complex MIMO detector processes, such as Maximum Apriori (MAP), Spherical Decoding (SD), K-BEST or V-BLAST to MIMO detection for the sub-channel having index "99", while allocating the linear and relative inexpensive MIMO detector processes, such as Minimum Mean Square Error (MMSE) or Zero Forcing (ZF) to MIMO detection for the sub-channel having index "0".

The benefits to this mixed or blended approach to MIMO detection are a decrease in resources and time required to process received MIMO transmissions.

FIG. 3A is a graph showing relative signal resolution capability of representative MIMO detectors in terms of packet error rate (PER) on the vertical axis and signal-to-noise ratio (SNR) in decibels on the horizontal axis.

Generally the non-linear MIMO detection processes are operable at much lower SNR than the less computationally complex linear MIMO detection processes. SNR versus PER is shown for a group of linear MIMO detector processes including: ZF 300 and MMSE 302. SNR versus PER is also shown for a group of non-linear MIMO detector processes including: K-BEST$_{10}$ 310, K-BEST$_{16}$ 312, SD 314, and MAP 316. The subscript in the case of the KBEST examples referring to the number of nodes "K" retained during the tree search.

FIG. 3B is a graph showing relative signal resolution capability of a representative mix of selected linear and non-linear MIMO detectors shown in FIG. 3A among selected OFDM sub-carriers. Spherical Decoding (SD) 314 has the best signal resolution capability but is computationally very expensive particularly as the constellation size supported by the communication channel increases as shown in the following figure. Minimum Mean Square Error (MMSE) has the worst signal resolution capability but is computationally relatively inexpensive and is independent of constellation size.

Line 330 shows a 5 db gain in signal resolution capability realized by randomly assigning a mix of linear and non-linear detectors to tones/sub-carriers. In the example shown 50% of the tones/sub-carriers are allocated linear MIMO detection, e.g. MMSE, and the remaining 50% of the sub-carriers are allocated to non-linear MIMO detection, e.g. SD, with the resultant 5 db gain.

Intelligent allocation of linear and non-linear MIMO detectors between sub-carriers based on their associated levels of channel correlation produces further benefits on the order of 7 db and with further reduction in computational complexity.

Line 332 shows a 7 db gain in signal resolution capability realized by intelligently assigning a mix of linear and non-linear detectors to tones/sub-carriers. In the example shown 75% of the tones/sub-carriers are allocated linear MIMO detection, e.g. MMSE, and the remaining 25% of the sub-carriers are allocated to non-linear MIMO detection, e.g. SD, with the resultant 7 db gain.

FIG. 3C is a graph showing relative signal resolution capability of a representative mix of selected linear and non-linear MIMO detectors shown in FIG. 3A among selected OFDM sub-carriers under different channel modulation protocols. The need for MIMO detector mixing is particularly evident at elevated constellation sizes as shown in FIG. 3C.

FIG. 3C on the left vertical axis shows relative processing MIPS associated with representative linear and non-linear MIMO detection processes discussed above. The horizontal axis shows whether and how that consumption varies as a function of modulation protocol and associated constellation size. Constellation sizes associated with: binary phase-shift key (BPSK), quadrature phase-shift key (QPSK), quadrature amplitude modulation (QAM) 16 and, quadrature amplitude modulation (QAM) 64 are shown. The right vertical axis shows the percent mix between representative linear, e.g.

MMSE and non-linear, e.g. K-BEST, MIMO detector processes on the sub-channels of a received spatially multiplexed MIMO data.

Generally the linear MIMO detector processes consume less resources and that minimal consumption does not vary with constellation size as shown by the MIPS versus constellation size line 362 for MMSE. Conversely, non-linear MIMO detection processes consume significantly greater resources and that consumption increases exponentially with regard to constellation size as shown for K-Best 364.

Blending linear and non-linear MIMO detectors subject to processing constraints requires a consideration of modulation protocol and associated constellation site in order to maintain constant resource utilization, e.g. MIPS, required for MIMO detection. In the example shown a blend of K-BEST allocated to MIMO detection on 90% of the received sub-channels and MMSE allocated to MIMO detection on the remaining 10% of the received sub-channels is appropriate for the small constellation sizes associated with BPSK. However as constellation size increases to that associated with QAM-64 K-BEST MIMO detection can only be allocated to 5% of the received sub channels and MMSE MIMO detection to the remaining 95% of the sub-channels if resource usage is to be held constant.

Figure 4:
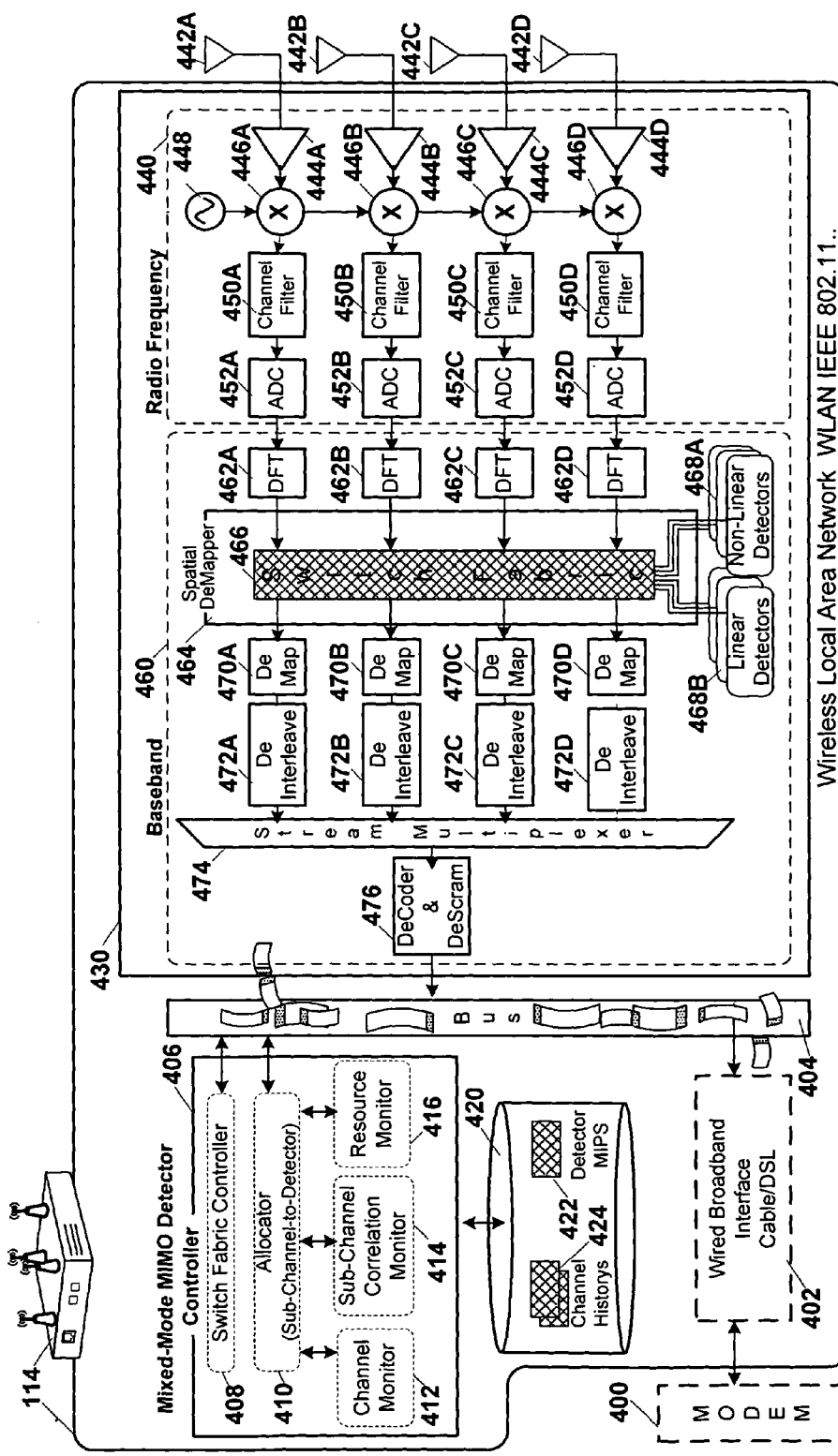
FIG. 4 is a detailed hardware block diagram of a wireless device incorporating the mixed-mode MIMO detector of the current invention.

FIG. 4 is a detailed hardware block diagram of a wireless device 114 shown in FIGS. 1A, 1B and 2, incorporating the mixed-mode MIMO detector of the current invention incorporating an embodiment of the Mixed-mode MIMO Detector discussed above in FIGS. 1A, 1B and 2.

The MIMO receive path components include antennas 442A, 442B, 442C, 442D, coupled to Rf module 440 and baseband module 460 of the wireless LAN stage 430, which implements the IEEE 802.11 standard.

The WLAN stage includes four discrete MIMO receive paths. A first MIMO receive path originates with the antenna 442A, and includes: low noise amplifier (LNA) 444A, the tunable oscillator 448 and mixer 446A which down convert the received data channel, for filtration by the channel filter 450A, conversion in the ADC 452A, domain conversion in the DFT 462A, spatial demapping in spatial demapper 464, demapping in the constellation demapper 470A, deinterleaving in deinterleaver 472A, multiplexing in stream multiplexer 474 and decoding and descrambling in the decoder and descrambler 476 which couples to the packet based bus 404.

The second MIMO receive path originates with the antenna 442B, and includes: LNA 444B, the shared tunable oscillator 448 and mixer 446B which down convert the received data channel, for filtration by the channel filter 450B, conversion in the ADC 452B, domain conversion in the DFT 462B, spatial demapping in spatial demapper 464, demapping in the constellation demapper 470B, deinterleaving in deinterleaver 472B, multiplexing in stream multiplexer 474 and decoding and descrambling in the shared decoder and descrambler 476 which couples to the packet based bus 204.

The corresponding third and fourth MIMO receive path components are labeled with the "C" and "D" suffix respectively.

The spatial demapper 464 includes a switch fabric 466 and banks of allocable linear and non-linear detectors 468B and 468A respectively. The switch fabric 466 under control of the mixed-mode MIMO detector controller 406 processes received sub-channels with a corresponding allocated one of the MIMO detectors 468A, 468B the resultant output of which is passed by the switch fabric to the corresponding one of the demappers 470A-D.

The mixed-mode MIMO detector controller includes: a switch fabric controller 408, an allocator 410, a channel monitor 412, a sub-channel correlation monitor 414, a resource monitor 416 and storage 420. In operation the channel monitor 412 monitors the received channel do determine MIMO channel parameters such as: stream count, constellation size, modulation protocol, bit loading and power level. The resource monitor 416 monitors processing resource levels. The sub-channel correlation monitor 414 determines the relative or absolute sub-channel correlation levels, e.g. un-correlated, semi-correlated, or highly correlated for each sub-channel. The allocator allocates sub-channels to MIMO detectors based on the information obtained by the monitoring components 412, 414, 416 as well as information contained in an estimated MIPS lookup table 422 in storage 420 and further in an embodiment of the invention based on channel histories 424 maintained in storage 420 by each of the monitoring components and by the allocator. Generally, the allocator balances available resources against sub-channel MIMO detection requirements to optimize MIMO detection. The switch fabric controller 408 takes the required mix of linear and non-linear MIMO detectors as determined by the allocator 410 and configures the switch fabric 466 of the spatial demapper accordingly.

In an embodiment of the invention where the wireless LAN device 114 comprises a wireless access point (WAP) the device also includes a broadband interface 402 for interfacing with a modem 400.

Figure 5:
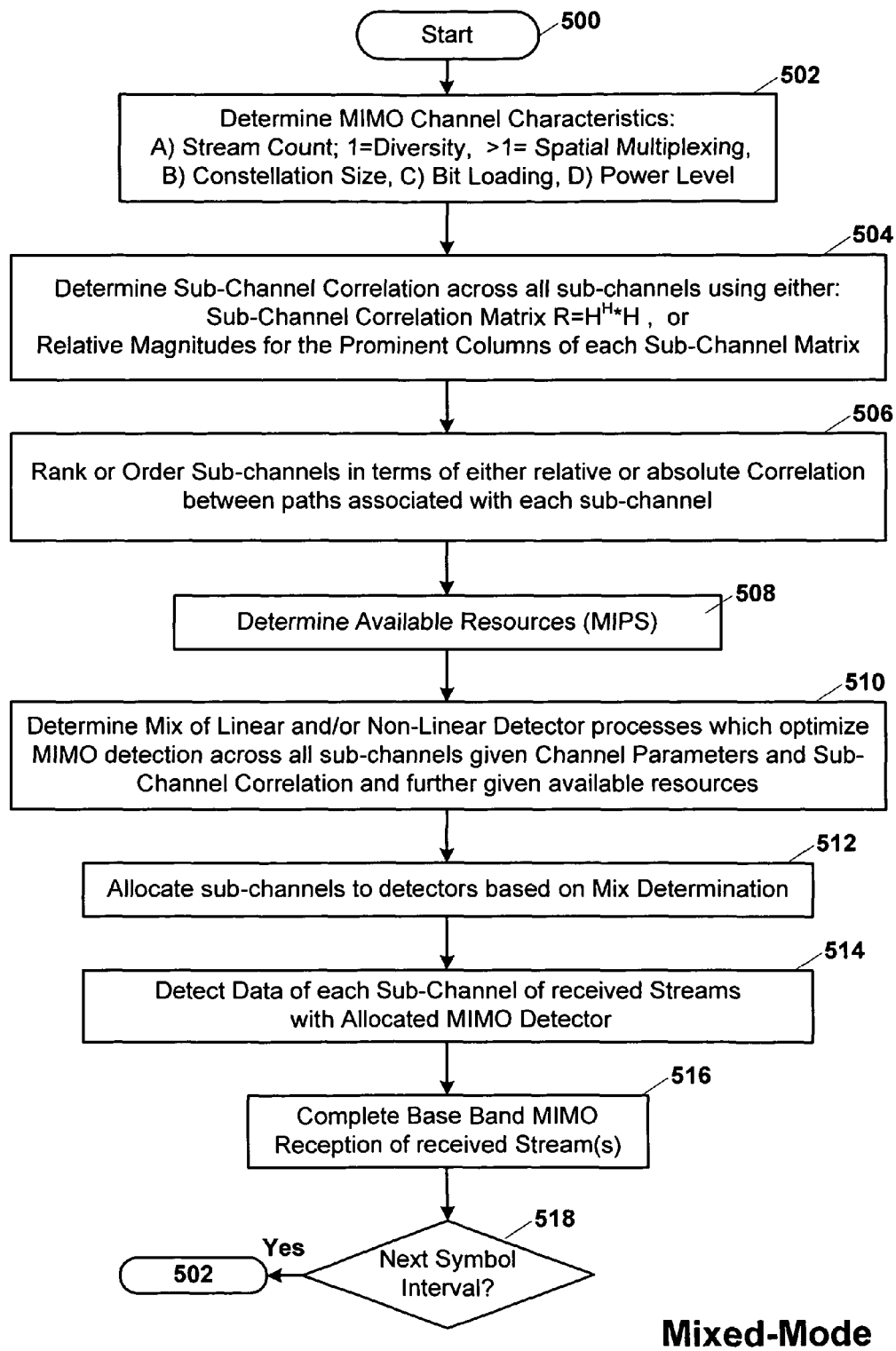
FIG. 5 is a process flow diagram of processes associated with mixed-mode MIMO detection in accordance with another embodiment of the current invention.

FIG. 5 is a process flow diagram of processes associated with mixed-mode MIMO detection in accordance with another embodiment of the current invention. After startup in process 500 control passed to process 502 in which MIMO channel characteristics/parameters are determined including: data stream count, constellation size, modulation protocol, bit loading and power level.

Next, in process 504-506 a determination is made as to sub-channel correlation across all sub-channels. In an embodiment of the invention sub-channel correlation is determined by converting the sub-channel matrix into a correlation matrix "R" where $R=H_n^{H}*H_n$. Here "$H_nH$" is the Hermetian of the sub-channel matrix. Next the Eigenvalues for the Correlation matrix are determined. Finally the sub-channels are ordered or ranked based on the disparity of the eigenvalues of each associated correlation matrix. The more disparate the resultant eigenvalues the less correlated the transmit paths for the associated sub-channel.

In an alternate embodiment of the invention a less computationally intensive method of ranking the relative correlation of each sub-channel is disclosed. In this embodiment of the invention the prominent column of each sub-channel matrix is determined based on a simple cumulative sum of the first or second norm of each column in each matrix. In each matrix the column with the highest absolute value is the prominent column of that matrix. Next the sub-channels are ordered in descending order of the magnitude of their associated prominent column's magnitude. Sub-channels the prominent columns of which have the highest cumulative magnitudes have the most highly correlated transmit paths and vice versa.

In an embodiment of the invention, non-linear and relatively complex MIMO detector processes, such as MAP, SD, K-BEST or V-BLAST will be allocated to MIMO detection for the sub-channels exhibiting a high degree of correlation, while the linear and relative inexpensive MIMO detector processes, such as MMSE or ZF will be allocated to MIMO detection for the sub-channel having a relatively low degree of correlation.

Next in process 508 a determination is made as to available resources e.g. hardware, firmware or software constraints, e.g. processor MIPS, for MIMO detection. Then in process 510 a determination is made as to the requisite mix of linear and or non-linear MIMO detector processes required for optimized MIMO detection given channel parameters and sub-channel correlations across all sub-channels and given available resources.

In process 512 sub-channels are allocated to MIMO detectors based on the mix determination of process 510. Then in process 514 the received communications are subject to the associated MIMO detection after which remaining base band receive path processes are completed on the received MIMO stream(s) in process 516.

Finally, in decision process 518 a determination is made as to the onset of the next symbol interval, or packet interval, in the event of which control returns to process 502 for re-iteration of all the above processes.

The components and processes disclosed herein may be implemented as software, hardware, firmware, or a combination thereof, without departing from the scope of the Claimed invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A wireless device configured to support multiple-input multiple-output (MIMO) communications on a plurality of orthogonal frequency-division multiplexed (OFDM) sub-Channels of a shared communication channel on a wireless local area network (WLAN); and the wireless device comprising:
a sub-channel correlation monitor to monitor receive path correlations of each of the OFDM sub-channels on the shared communication channel and to determine at least the correlation level for each sub-channel relative to other sub-channels;
a pool of linear and non-linear MIMO detectors each switchably selectable for performing MIMO detection on a designated one of the OFDM sub-channels; and
a sub-channel allocator coupled to the sub-channel correlation monitor and to the pool of MIMO detectors and responsive to the relative correlation levels determined by the sub-channel correlation monitor to switchably couple uncorrelated ones of the sub-channels to linear ones among the pool of detectors and to switchably couple correlated ones of the sub-channels to non-linear ones among the pool of MIMO detectors whereby the allocation of the linear and non-linear detectors among received OFDM sub-channels varies with MIMO detection requirements of each sub-channel.

2. The wireless device of claim 1, further comprising:
a resource monitor to monitor processing resources available on the wireless device; and
the sub-channel allocator further responsive to changes in processing resources as determined by the resource monitor to re-allocate linear and non-linear detectors, thereby balancing sub-channel MIMO detection requirements and available processing resources.

3. A method of operating a wireless device configured to support multiple-input multiple-output (MIMO) communications on a plurality of orthogonal frequency-division multiplexed (OFDM) sub-channels of a shared communication channel on a wireless local area network (WLAN); and the method comprising:
determining at least the sub-channel receive path correlation level for each OFDM sub-channel relative to other sub-channels;
providing a pool of linear MIMO detectors and non-linear MIMO detectors; and
allocating uncorrelated ones of the sub-channels to linear ones among the pool of MIMO detectors and correlated ones of the sub-channels to non-linear ones among the pool of MIMO detectors provided in the providing act responsive to the sub-channel receive path correlations determined in the determining act; whereby the allocation of the linear and non-linear detectors among received OFDM sub-channels varies with MIMO detection requirements of each sub-channel.

4. The method for operating a wireless device of claim 3 wherein the allocating act further comprises:
determining an associated processing complexity for each of the linear and non-linear detectors provided in the providing act; and
allocating the linear and non-linear MIMO detectors to received OFDM sub-channels based both on the relative sub-channel receive path correlations of each OFDM sub-channel as determined in the first determining act together with an associated processing complexity associated with each MIMO detector type as determined in the second determining act, thereby balancing MIMO detection requirements and available processing resources.

5. The method for operating a wireless device of claim 3 wherein the determining act further comprises:
identifying a prominent column of a corresponding sub-channel matrix for each of the OFDM sub-channels; and
ordering the OFDM sub-channels based on a magnitude of each associated prominent column identified in the identifying act.

6. A method of operating a wireless device with multiple antennae and configured to support orthogonal frequency-division multiplexed (OFDM), multiple-input multiple-output (MIMO) communications of a wireless local area network (LAN) among multiple wireless devices over a shared wireless communication medium on a shared communication channel; and the method comprising;
providing both linear together with non-linear MIMO detectors; and
allocating a mix of the linear and non-linear MIMO detectors provided in the providing act, among received OFDM sub-channels of the shared communication channel, thereby reducing a level of complexity associated with reception of MIMO streams exclusively via non-linear MIMO detectors, and further:
determining at least relative sub-channel receive path correlations among the OFDM sub-channels by:
converting a sub-channel matrix "$H_n$" for each sub-channel "n" to a correlaton matrix "R" where $R=H_n^{H}*H_n$ where "$H_n^{H}$" comprises an Hermetian Matrix.

7. A means for operating a wireless device with multiple antennae and configured to support orthogonal frequency-division multiplexed (OFDM), multiple-input multiple-output (MIMO) communications of a wireless local area network (LAN) among multiple wireless devices over a shared wireless communication medium on a shared communication channel; and the means comprising:
means for providing both linear together with non-linear MIMO detectors; and
means for allocating a mix of the linear and non-linear MEMO detectors provided in the providing act, among received OFDM sub-channels of the shared communication channel, thereby reducing a level of complexity associated with reception of MIMO streams exclusively via non-linear MIMO detectors; and wherein the means for allocating further comprises:

means for determining at least relative sub-channel receive path correlations among the OFDM sub-channels by: converting a sub-channel matrix "$H_n$" for each sub-channel "n" to a correlation matrix "R" where $R=H_n^H * H_n$ where "$H_n^H$" comprises an Hermetian Matrix.

8. The wireless device of claim 1, further comprising:

a switch fabric coupled to the pool of MIMO detectors and responsive to the sub-channel allocator to switchably couple uncorrelated ones of the sub-channels to linear ones among the pool of detectors and to switchably couple correlated ones of the sub-channels to non-linear ones among the pool of MIMO detectors.

9. The method of claim 3, wherein the allocating act, further comprises:

varying the allocation of linear and non-linear MIMO detectors as a modulation protocol of the communication channel and associated constellation size increases in complexity; whereby the allocation of the linear and non-linear detectors among received OFDM sub-channels varies with both the MIMO detection requirements of each sub-channel together with the modulation protocol of the communication channel.

\* \* \* \* \*